United States Patent [19]

Fujisaka et al.

[11] Patent Number: 5,059,966
[45] Date of Patent: Oct. 22, 1991

[54] SYNTHETIC APERTURE RADAR SYSTEM

[75] Inventors: Takahiko Fujisaka; Yoshimasa Oh-Hashi, both of Kanagawa, Japan

[73] Assignee: Mitsubishi Denki Kabushiki Kaisha, Tokyo, Japan

[21] Appl. No.: 477,346

[22] Filed: Feb. 8, 1990

[30] Foreign Application Priority Data

Feb. 10, 1989 [JP] Japan .................. 1-31657

[51] Int. Cl.$^5$ ............................. G01S 13/90
[52] U.S. Cl. .................... 342/25; 342/195; 342/196; 342/201; 342/202
[58] Field of Search ............ 342/25, 196, 201, 202, 342/195, 192

[56] References Cited

U.S. PATENT DOCUMENTS

| | | | |
|---|---|---|---|
| 4,034,370 | 7/1977 | Mims | 342/25 |
| 4,212,084 | 7/1980 | Poole | 367/118 |
| 4,216,475 | 8/1980 | Johnson | 342/373 |
| 4,544,927 | 10/1985 | Kurth et al. | 342/373 |
| 4,616,227 | 10/1986 | Homma et al. | 342/25 |
| 4,656,479 | 4/1987 | Kirimoto et al. | 342/94 |
| 4,879,559 | 11/1989 | Arambepola | 342/25 |
| 4,881,079 | 11/1989 | Peregrim | 342/194 |
| 4,901,082 | 2/1990 | Schreiber et al. | 342/89 |
| 4,922,257 | 5/1990 | Saito et al. | 342/377 |
| 4,924,235 | 5/1990 | Fujisaka et al. | 342/374 |

OTHER PUBLICATIONS

Wehner, Donald R., "High Resolution Radar", pp. 203-217, Artech House, Inc., 1987.
Ruvin, Abraham E. et al., "Digital Beamforming Techniques for Radar", IEEE, Escon-78, pp. 152-163, (1978).

Primary Examiner—John B. Sotomayor
Attorney, Agent, or Firm—Wolf, Greenfield & Sacks

[57] ABSTRACT

A synthetic aperture radar system wherein a plurality of beams is formed for receiving echo signals and the spectra of the received signals are synthesized in an azimuth compression unit to improve the cross-range resolution.

1 Claim, 3 Drawing Sheets

Fig. 3
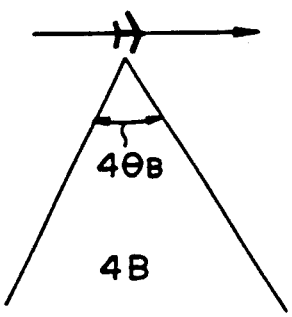
Fig. 4
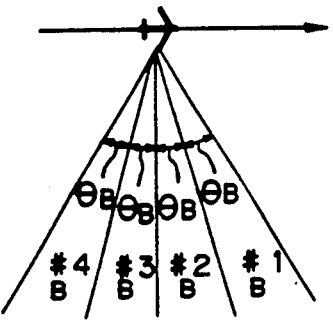
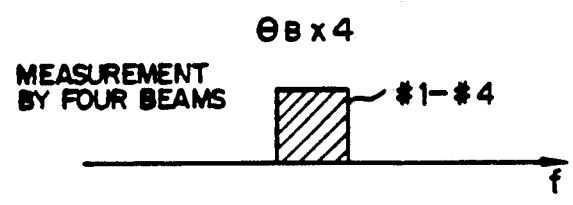
Fig. 6A
Fig. 5
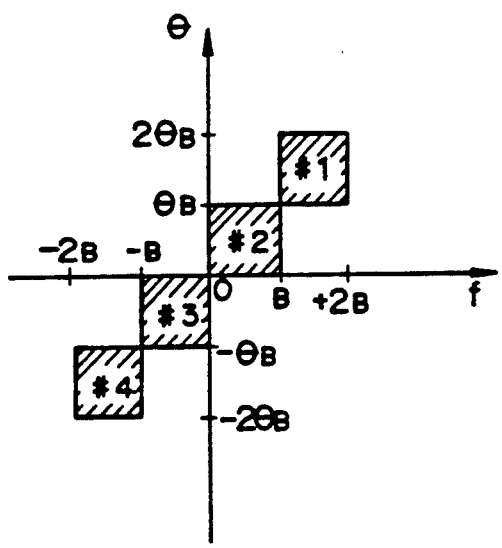
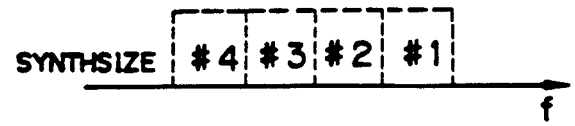
Fig. 6B
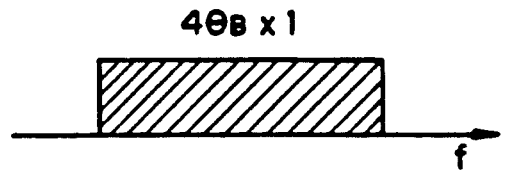
Fig. 6C

SYNTHETIC APERTURE RADAR SYSTEM

BACKGROUND OF THE INVENTION

1. Field of the Invention

This invention relates to a synthetic aperture radar system mounted on a moving radar platform, such as an aircraft or the like, for providing an image of a stationary object on the surface of the earth or sea.

2. Prior Art

FIG. 1 diagrammatically shows a conventional synthetic aperture radar system.

The conventional radar system, as shown in FIG. 1, comprises a transmitter 1, a transmitting antenna 2 for emitting radio waves to a stationary object constituting a target to be observed, a receiving antenna 3 for receiving echo signals reflected back from the target, a receiver 4, a pulse compression unit 5 for enhancing the resolution in the lengthwise direction of the received signals (range resolution), an azimuth compression section 6 for achieving high resolution in the azimuth direction (cross-range resolution), a display 7 for visually presenting images obtained from the radar system and a reference signal generator 8 for providing the azimuth compression section 6 with data showing the history of changes in Doppler frequency with time as a reference signal for the azimuth compression. The azimuth compression section 6 includes a first Fourier transform unit 61 for carrying out the Fourier transform of the output of the pulse compression unit 5, a second Fourier transmission unit 62 for carrying out the Fourier transform of the output of the reference signal generator 8, a complex multiplication unit 63 for carrying out the complex multiplication of the outputs of the first and second Fourier transform units 61 and 62, and an inverse Fourier transform unit 64 for carrying out the inverse Fourier transform of the output of the complex multiplication unit 63. The transmitter 1 and the transmitting antenna 2 constitute a transmission means 9 and the receiving antenna 3 and the receiver 4 constitute a reception means 10.

By such an arrangement, the radio wave emitted from the transmitter 1 via the transmitting antenna 2 towards the target to be observed is reflected back by the target as an echo signal to the receiving antenna 3.

The received echo signal is directed through the receiver 4 to the pulse compression unit 5 in which a pulse compression operation is achieved for enhancing the range resolution.

As an example for achieving such pulse compression, there is known a system including a matched filter having frequency-delay time characteristics, wherein a radio wave linearly frequency-modulated within the pulse width of the transmission pulse is transmitted and the returned echo signal is passed through the matched filter.

The echo signal subjected to the pulse compression is directed to the azimuth compression section 6 in which the azimuth compression is carried out by the first and second Fourier transform units 61, 62, the complex multiplication unit 63 and the inverse Fourier transform unit 64, whereby the cross-range resolution is improved on the basis of the reference signal output by the reference signal generator 8.

In the case of an aircraft travelling with a speed v and emitting radio waves in a downward direction perpendicular to the direction of motion, the Doppler effect caused by the relative movements between the aircraft and the ground is utilized so that the cross-range resolution in the direction of the flight path can be enhanced by obtaining a correlation between a series of the received signals and the reference signal designating the history of variation with time of the Doppler frequency.

In this manner, the image information obtained with range and cross-range resolutions enhanced is displayed on the display 7.

With such a conventional synthetic aperture radar system as described above, the cross-range resolution $\Delta \gamma$ can be obtained by the following expression using the antenna beam width $\theta_B$ and transmission wave length $\lambda$.

$$\Delta \gamma \approx \frac{\lambda}{2\theta_B} = \frac{v}{B} \qquad (1)$$

The bandwidth B of the Doppler frequency of the received signal can also be obtained by:

$$B \approx \frac{2v\theta_B}{\lambda} = \frac{v}{\Delta \gamma} \qquad (2)$$

In order to enhance the resolution $\Delta \gamma$, therefore, it is necessary to increase the beam width $\theta_B$. However, as the beam width $\theta_B$ increases, the necessary frequency bandwidth B is increased to require a higher pulse repetition frequency PRF (PRF>B), and the maximum observation distance $R_{max}$ without range ambiguity is limited according to the following expression using the velocity of light C and the moving velocity of the radar v.

$$R_{max} \leq \frac{C}{2B} = \frac{C\lambda}{4v\theta_B} \qquad (3)$$

Thus, the conventional system was subjected to problems such that if it was intended to enhance the resolution, a far distant region could not be observed and if it was intended to make far distant observation, the resolution was reduced.

SUMMARY OF THE INVENTION

With the foregoing problems as described above in mind, it is an object of the present invention to provide a synthetic aperture radar system capable of improving the cross-range resolution and the observation distance performance.

According to the present invention, there is provided a synthetic aperture radar system in which a receiving means is provided with a digital beam forming antenna for digitally processing the echo signals received through a plurality of antenna elements by using analog-to-digital (A/D) conversion to simultaneously form a plurality of receiving beams in different directions, a pulse compression means being provided for the respective outputs of the digital beam forming antenna, and an azimuth compression means being provided with first Fourier transform units for the respective outputs and a spectral synthesis unit for synthesizing the spectra of the respective outputs of the first Fourier transform units to supply the output to a complex multiplication unit.

With this arrangement, for signal reception, a plurality of narrow reception beams is simultaneously formed in different directions using the digital beam forming antenna so that the Doppler frequency bandwidth of each of the beams is narrowed with the pulse repetition frequency lowered and the spectral synthesis is performed for the number of the beams by azimuth compression to expand the bandwidth, whereby the observation range is increased and the cross-range resolution is improved.

BRIEF DESCRIPTION OF THE DRAWINGS

The present invention will now be further described in detail by way of a preferred embodiment with reference to the accompanying drawings. Similar components to those of the prior art described above will be referred to by the same numerals and further description thereof will be omitted.

FIGS. 3 to 6 are illustrations for explaining the function of the embodiment.

DETAILED DESCRIPTION OF THE PREFERRED EMBODIMENT

Figure 1:
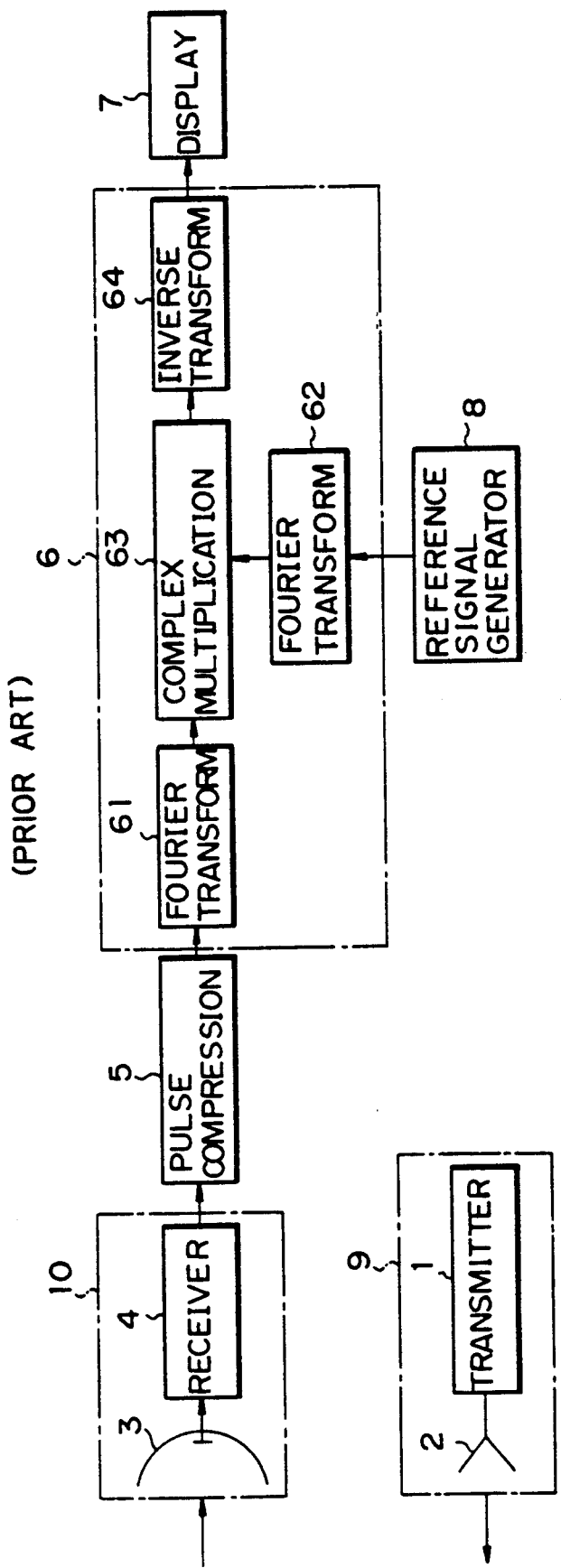
FIG. 1 is a block diagram of a conventional synthetic aperture radar system.
Figure 2:
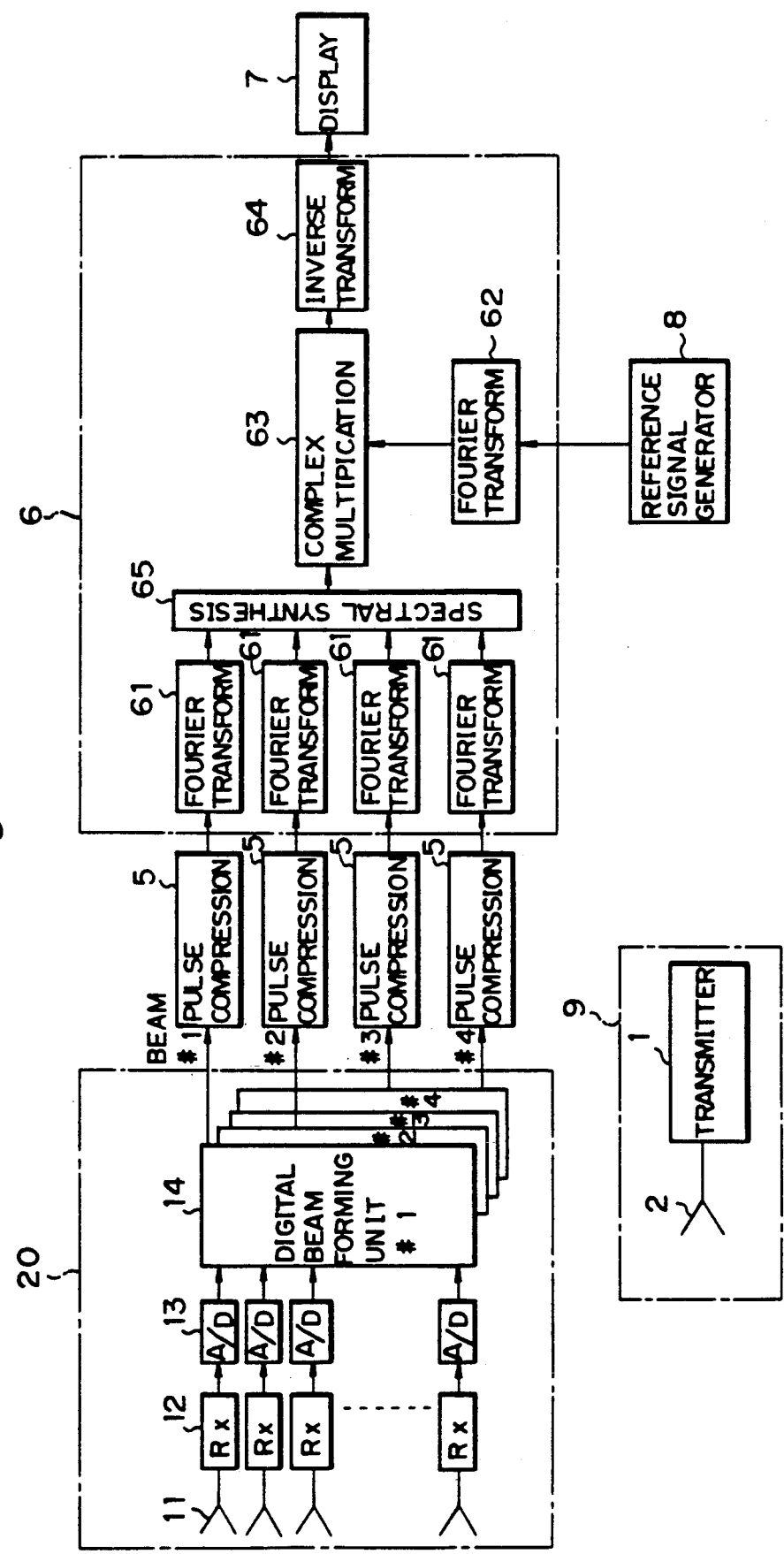
FIG. 2 is a block diagram of a synthetic aperture radar system according to an embodiment of the present invention.

Referring now to FIG. 2, a synthetic aperture radar system according to the present invention comprises a plurality of antenna elements 11 arranged in a one dimensional or two dimensional configuration, receivers (Rx) 12 connected to the respective antenna elements 11 for receiving radio waves therethrough, AD converters 13 connected to the respective receivers 12 for analog-to-digital conversion, and a plurality of digital beam forming units 14 for receiving a plurality of digital signals simultaneously transferred from the A/D converters 13, performing discrete Fourier transform (DFT) and discriminating the radio waves received from different directions to output them. Thus, the antenna elements 11, the receivers 12, the A/D converters 13 and the digital beam forming units 14 constitute a digital beam forming (DBF) antenna 20 which is capable of simultaneously forming a plurality of receiving beams directed in different directions without any scanning operation. The present invention utilizes such digital beam forming antenna 20 as receiving means, pulse compression units 5 being provided for the respective outputs of the digital beam forming units 14 (four units being provided in this embodiment). An azimuth compression section 6 is also provided with first Fourier transform units 61 for the respective pulse compression units 5, and there is further provided a spectral synthesis unit 65 for synthesizing the spectra of the respective outputs of the respective first Fourier transform units 61, and the output of the spectral synthesis unit 65 is supplied to a complex multiplication unit 63.

The operation will now be described.

A transmission signal having a beam width $4\theta_B$ which is four times that of the conventional system, as shown in FIG. 3, is radiated from a transmitter 1 through a transmitting antenna 2.

On the other hand, the signal reception is carried out using the digital beam forming antenna 20, and, as shown in FIG. 4, four narrow beams No. 1–No. 4 (beam width of $\theta_B$) for reception directed to respective small areas of a target object to be observed are formed and echo signals from the respective small areas are simultaneously received. The respective echo signals received are processed by the corresponding pulse compression units 5 to enhance their range resolution. The received signals for the respective beams have different center frequencies, as shown in FIG. 5, but all have the same bandwidth B. Therefore, the pulse repetition frequency PRF is sufficient, i.e., PRF=B, to avoid a reduction in the observation distance.

The outputs of the respective pulse compression units 5 are supplied to the respective first Fourier transform units 61 of the azimuth compression section 6 and subjected to the pulse compression and Fourier transform to obtain four spectra of bandwidth B which are, in turn, synthesized by a spectral synthesis unit 65 to a spectrum of bandwidth 4B and azimuth compression is performed to provide such a resolution $\Delta\gamma$ as represented by the following equation and enhanced by the number of the beam, i.e., four times that of the conventional system.

$$\Delta\gamma \approx \frac{v}{4B} = \frac{1}{4} \frac{\lambda}{2\theta_B}$$

FIGS. 6(a) to (c) show the concept of expanding the Doppler frequency bandwidth by the spectrum synthesization.

In this manner, the utilization of the digital beam forming antenna 20 using a plurality of narrow beams in the receiving means narrows the Doppler frequency bandwidth in the respective beams during the pulse compression and makes it possible to prevent a reduction in the observation distance, and the spectral synthesis of the plurality of beam outputs can expand the bandwidth of the signals to be subjected to azimuth compression, thereby providing a high resolution.

Although the embodiment has been described in which the cross-range resolution is enhanced without reducing the observation distance, the present invention can be applied for enhancing an observation distance without reducing the cross-range resolution, or for enhancing both the cross-range resolution and the observation distance, which may be determined by setting the number of beams, etc., depending upon the application of the radar system.

As described above, the present invention is advantageous in that the receiving means is provided with the digital beam forming antenna for A/D conversion and digitally processing the echo signals received through a plurality of the antenna elements to permit the simultaneous formation of a plurality of beams for reception directed in different directions to provide pulse compression means for each of the outputs and the azimuth compression means is provided with first Fourier transform units for each of the outputs and also with a spectral synthesis unit for synthesizing the spectra of the respective outputs to provide an output to the complex multiplication unit, thereby enhancing the cross-range resolution and the observation distance.

What is claimed is:

1. In a synthetic aperture radar system comprising transmission means mounted on a moving radar platform for transmitting radio waves to and receiving them from a stationary object to be observed, reception means for receiving echo signals reflected by the object, pulse compression means for enhancing the range resolution of the received signals, azimuth compression means for enhancing the cross-range resolution, and reference signal generation means for generating a reference signal required for performing the azimuth compression, said azimuth compression means including a first Fourier transform means for performing Fourier transform of the output of the pulse compression means, a second Fourier transform means for performing Fourier transform of the output of the reference signal generation means, a complex multiplication section for carrying out the complex multiplication of the outputs of said first and second Fourier transform means, and an inverse Fourier transform means for performing inverse Fourier transform of the output of the complex multiplication means, the improvement wherein said reception means is provided with a digital beam forming antenna for A/D converting and digitally processing the echo signals received through a plurality of antenna elements to simultaneously form a plurality of beams for reception directed in different directions, said pulse compression means being provided for respective outputs of the digital beam forming antenna, and the azimuth compression means being provided with first Fourier transform means for each of said respective outputs and also with a spectral synthesis means for synthesizing the spectra of the respective outputs to provide an output to the complex multiplication means.

* * * * *